(12) United States Patent
Reed et al.

(10) Patent No.: US 9,407,058 B2
(45) Date of Patent: *Aug. 2, 2016

(54) PUMP ENERGY WAVELENGTH STABILIZATION

(71) Applicant: AMS Research, LLC, Minnetonka, MN (US)

(72) Inventors: Edward D. Reed, Sunnyvale, CA (US); Raymond Adam Nemeyer, Cupertino, CA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/532,234

(22) Filed: Nov. 4, 2014

(65) Prior Publication Data

US 2015/0071317 A1 Mar. 12, 2015

Related U.S. Application Data

(63) Continuation of application No. 12/555,329, filed on Sep. 8, 2009, now Pat. No. 8,897,326.

(60) Provisional application No. 61/095,082, filed on Sep. 8, 2008.

(51) Int. Cl.
*H01S 3/131* (2006.01)
*H01S 3/091* (2006.01)
(Continued)

(52) U.S. Cl.
CPC ........... *H01S 3/0912* (2013.01); *H01S 3/09415* (2013.01); *H01S 3/13* (2013.01);
(Continued)

(58) Field of Classification Search
CPC .... H01S 3/1673; H01S 3/1611; H01S 3/1643
See application file for complete search history.

(56) References Cited

U.S. PATENT DOCUMENTS

| 4,907,235 A | 3/1990 | Kuizenga |
| 4,974,230 A | 11/1990 | Hemmati |

(Continued)

FOREIGN PATENT DOCUMENTS

| EP | 0814550 A2 | 12/1997 |
| EP | 1923971 A1 | 5/2008 |
| JP | 4137775 | 5/1992 |

OTHER PUBLICATIONS

Xu, Degang, Wang, Yuye, Li, Haifeng, Yao, Jianquan, Tsang, Yuen H. "104 W high stability green laser generation by using diode laser pumped intracavity frequency-doubling Q-switched composite ceramic Nd:YAG laser" Apr. 2, 2007, vol. 15, No. 7, Optics Express 3991, (7 pages).

(Continued)

*Primary Examiner* — Jessica Stultz
*Assistant Examiner* — Sean Hagan
(74) *Attorney, Agent, or Firm* — Bookoff McAndrews, PLLC

(57) ABSTRACT

In a method of stabilizing pump energy, a gain medium is provided having an absorption coefficient that varies with wavelength. An absorption coefficient curve of the absorption coefficient or a range of wavelengths comprises peaks and valleys. Pump energy is generated at an operating wavelength within one of the valleys, at which the absorption coefficient is approximately at a minimum. The pump energy is transmitted through the gain medium. A portion of the pump energy is absorbed with the gain medium and laser light is emitted from the gain medium responsive to the absorbed pump energy. The non-absorbed pump energy (feedback pump energy) is fed back to the pump module. The operating wavelength of the pump energy is stabilized using the feedback pump energy.

20 Claims, 4 Drawing Sheets

(51) Int. Cl.
| | |
|---|---|
| *H01S 3/13* | (2006.01) |
| *H01S 3/0941* | (2006.01) |
| *H01S 3/04* | (2006.01) |
| *H01S 3/081* | (2006.01) |
| *H01S 3/10* | (2006.01) |
| *H01S 3/109* | (2006.01) |
| *H01S 3/11* | (2006.01) |

(52) U.S. Cl.
CPC ............ *H01S 3/0407* (2013.01); *H01S 3/0816* (2013.01); *H01S 3/109* (2013.01); *H01S 3/10069* (2013.01); *H01S 3/11* (2013.01); *H01S 3/1312* (2013.01)

(56) References Cited

U.S. PATENT DOCUMENTS

| | | | |
|---|---|---|---|
| 5,022,041 A * | 6/1991 | Jacobs ........................... | 372/70 |
| 5,025,446 A | 6/1991 | Kuizenga | |
| 5,185,758 A | 2/1993 | Fan et al. | |
| 5,337,325 A | 8/1994 | Hwang | |
| 5,415,655 A | 5/1995 | Fuller et al. | |
| 5,530,709 A | 6/1996 | Waarts et al. | |
| 5,638,397 A | 6/1997 | Nighan, Jr. et al. | |
| 5,689,522 A | 11/1997 | Beach | |
| 5,809,048 A | 9/1998 | Shichijyo et al. | |
| 5,844,149 A | 12/1998 | Akiyoshi et al. | |
| 5,859,868 A | 1/1999 | Kyusho et al. | |
| 5,907,052 A | 5/1999 | Nighan et al. | |
| 5,974,074 A | 10/1999 | Mayor et al. | |
| 6,026,101 A | 2/2000 | Suzudo et al. | |
| 6,069,907 A | 5/2000 | Chang | |
| 6,185,236 B1 | 2/2001 | Eichenholz et al. | |
| 6,246,706 B1 | 6/2001 | Kafka et al. | |
| 6,347,101 B1 | 2/2002 | Wu et al. | |
| 6,366,596 B1 | 4/2002 | Yin et al. | |
| 6,407,535 B1 | 6/2002 | Friedman et al. | |
| 6,421,573 B1 | 7/2002 | Kafka et al. | |
| 6,483,858 B1 | 11/2002 | Hovater et al. | |
| 6,504,858 B2 | 1/2003 | Cheng et al. | |
| 6,570,902 B2 | 5/2003 | Peressini | |
| 6,661,568 B2 | 12/2003 | Hollemann et al. | |
| 6,671,305 B2 | 12/2003 | Knights et al. | |
| 6,898,231 B2 | 5/2005 | Butterworth | |
| 7,046,712 B2 * | 5/2006 | Arbore et al. .................... | 372/75 |
| 7,200,161 B2 * | 4/2007 | Vetrovec ......................... | 372/70 |
| 8,897,326 B2 * | 11/2014 | Reed et al. ................. | 372/29.02 |
| 2003/0021324 A1 | 1/2003 | Filgas | |
| 2007/0098024 A1 | 5/2007 | Mitchell | |
| 2008/0144690 A1 | 6/2008 | Mitchell | |
| 2010/0061412 A1 | 3/2010 | Reed, Jr. et al. | |

OTHER PUBLICATIONS

Prosecution history of U.S. Appl. No. 11/261,010, filed Oct. 28, 2005.

U.S. Appl. No. 61/095,082, filed Sep. 8, 2008.
U.S. Appl. No. 61/094,462, filed Sep. 5, 2008.
International Search Report and Written Opinion of PCT/US2009/056193, filed Sep. 8, 2009.
Bi, Yong et al., "Configuration to improve second-harmonic-generation conversion efficiency", Applied Optics, Feb. 10, 2004, vol. 43, No. 5, pp. 1174-1179.
Honea, Eric, C. et al., "115-W Tm:YAG Diode-Pumped Solid-State Laser", IEE Journal of Quantum Electronics, Sep. 1997, vol. 33, No. 9, pp. 1592-1600.
Honea, Eric, C. et al., "Analysis of an intracavity-doubled diode-pumped Q-switched Nd:YAG laser producing more that 100 W of power at 0.532 µm" Optical Letters, Aug. 1, 1998, vol. 23, No. 15, pp. 1203-1205.
Kasamatsu, Tadashi et al., "Laser-diode-pumped Nd:YAG active-mirror laser" Applied Optics, Mar. 20, 1997, vol. 36, No. 9, pp. 1879-1881.
Lai, K.S. et al., "120-W continuous-wave diode-pumped Tm:YAG laser" Optics Letters, Nov. 1, 2000, vol. 25, No. 21, pp. 1591-1593.
Lin, Guo, et al., "Diode-end-pumped passively mode-locked ceramic Nd:YAG Laser with a semiconductor saturable mirror" Optics Express, May 30, 2005, vol. 13, No. 11, pp. 4085-4089.
Liu, Qiang, et al., "520-W continuous-wave diode corner-pumped composite Yb:YAG slab laser", Optics Letters, Apr. 1, 2005, vol. 30, No. 7, pp. 726-728.
Saint-Gobain Crystals "Nd:YAG Neodymium-Doped YAG Laser Crystals".
Paschotta, R., et al., "Diode-pumped passively mode-locked lasers with high average power" Appl. Phys. B., May 24, 2000, 70 [Suppl.], pp. S25-S31.
Schiehlen, Eckart, et al., "Diode-Pumped Semiconductor Disk Laser With Intracavity Frequency Doubling Using Lithium Triborate (LBO)" IEEE Photonics Technology Letters, Jun. 2002, vol. 14, No. 6, pp. 777-779.
Mingxin, Qiu, et al., "Perfomance of a Nd:YVO4 microchip laser with continuous-wave pumping at wavelengths between 741 and 825 nm" Applied Optics, Apr. 20, 1993, vol. 32, No. 12, pp. 2085-2086.
Martel, G., et al., "Experimental and theoretical evidence of pump-saturation effects in low power end-pumped Nd: YVO4 microchip laser" Optics Communications, Sep. 28, 2000, vol. 185, pp. 419-430.
Tusnekane, M., "High power operation of diode-end pumped Nd:YVO4 laser using composite rod with undoped end", Electronic Letters, Jan. 4, 2005, vol. 32, No. 1, pp. 40-42.
Hardman, P.J., "Energy-Transfer Upconversion and Thermal Lensing in High-Power End-Pumped Nd:YLF Laser Crystals", IEEE Journal Quantum Electronics, Apr. 4, 1999, vol. 35.
Pollnau, M., "Upconversion-induced heat generation and thermal lensing in Nd:YLF and Nd:YAG", Physical Review B, Dec. 15, 1998. vol. 58, No. 24, pp. 076-091.
Prosecution history of U.S. Appl. No. 14/532,234 including Final Office Action mailed Mar. 30, 2011 and Non-Final Office Action mailed Nov. 17, 2010.

* cited by examiner

PUMP ENERGY WAVELENGTH STABILIZATION

CROSS-REFERENCE TO RELATED APPLICATIONS

This application is a continuation of U.S. application Ser. No. 12/555,329, filed Sep. 8, 2009, which claims the benefit of U.S. provisional patent application Ser. No. 61/095,082, filed Sep. 8, 2008. The content of each of the above-identified applications are hereby incorporated by reference in their entirety.

BACKGROUND OF THE INVENTION

Embodiments of the invention are directed to the stabilization of the wavelength of the pump energy while pumping a laser gain medium.

High power laser systems have a broad range of applications throughout the scientific, industrial and medical fields. Laser systems generally include a pump module, a gain medium and a laser resonator. The pump module includes laser diodes or bars that generate pump energy. The gain medium absorbs the pump energy and emits laser light responsive to the absorbed energy. The laser resonator, in some designs, operates to generate a harmonic of the laser light.

The gain medium is generally tuned to absorb pump energy having a wavelength that is within a specified operating band. Thus, the wavelength of the pump energy must be carefully controlled to ensure proper operation of the laser system.

Pumping a yttrium-aluminum-garnet crystal (YAG) rod with neodymium atoms (i.e., a Nd:YAG gain medium) using pump energy having a wavelength of 885 nm has become a desirable pumping scheme due to its natural efficiency gains that can save on cost and electrical/cooling requirements. However, the operating wavelength band of the Nd:YAG gain medium around the 885 nm wavelength is very narrow. Unfortunately, Small changes in the wavelength of the pump energy can cause rapid decreases in the absorption efficiency of the gain medium. Moreover, the wavelength shift in the pump energy away from the narrow operating bandwidth of the Nd:YAG gain medium around 885 nm can also destabilize the wavelength of the pump energy causing it to further deviate from the operating wavelength range of the gain medium.

One option for stabilizing the wavelength of the pump energy is to use a Variable Bragg Grating (VBG) to stabilize the wavelength of the pump energy. However, VBG's are expensive and reduce the efficiency of the pump energy to laser conversion.

SUMMARY

Embodiments of the invention are directed to a method and a laser system in which the wavelength of the pump module is stabilized while pumping the gain medium. In one embodiment of the method, a gain medium is provided having an absorption coefficient that varies with wavelength. An absorption coefficient curve of the absorption coefficient over a range of wavelengths comprises peaks and valleys. A pump module is operated to output pump energy at an operating wavelength within one of the valleys, at which the absorption coefficient is approximately less than 40% of the absorption coefficient at an adjacent peak of the absorption coefficient curve defining the valley. The pump energy is directed through the gain medium. A portion of the pump energy is absorbed with the gain medium and laser light is emitted from the gain medium responsive to the absorbed pump energy. The non-absorbed pump energy (feedback pump energy) is fed back to the pump module. The operating wavelength of the pump energy is stabilized using the feedback pump energy.

One embodiment of the laser system comprises a pump module, a gain medium and a reflector. The pump module outputs pump energy at an operating wavelength. The gain medium is configured to absorb the pump energy and emit laser light responsive to the absorbed pump energy. The absorption coefficient of the gain medium has a magnitude that varies with wavelength. The absorption coefficient curve of the absorption coefficient over a range of wavelengths comprises peaks and valleys. The operating wavelength of the pump energy is within a valley of the absorption coefficient curve, at which the absorption coefficient is approximately at a minimum within the valley. The reflector is within the path of the pump energy and is configured to direct the non-absorbed portion of the pump energy back to the pump module.

DETAILED DESCRIPTION OF ILLUSTRATIVE EMBODIMENTS

Figure 1:
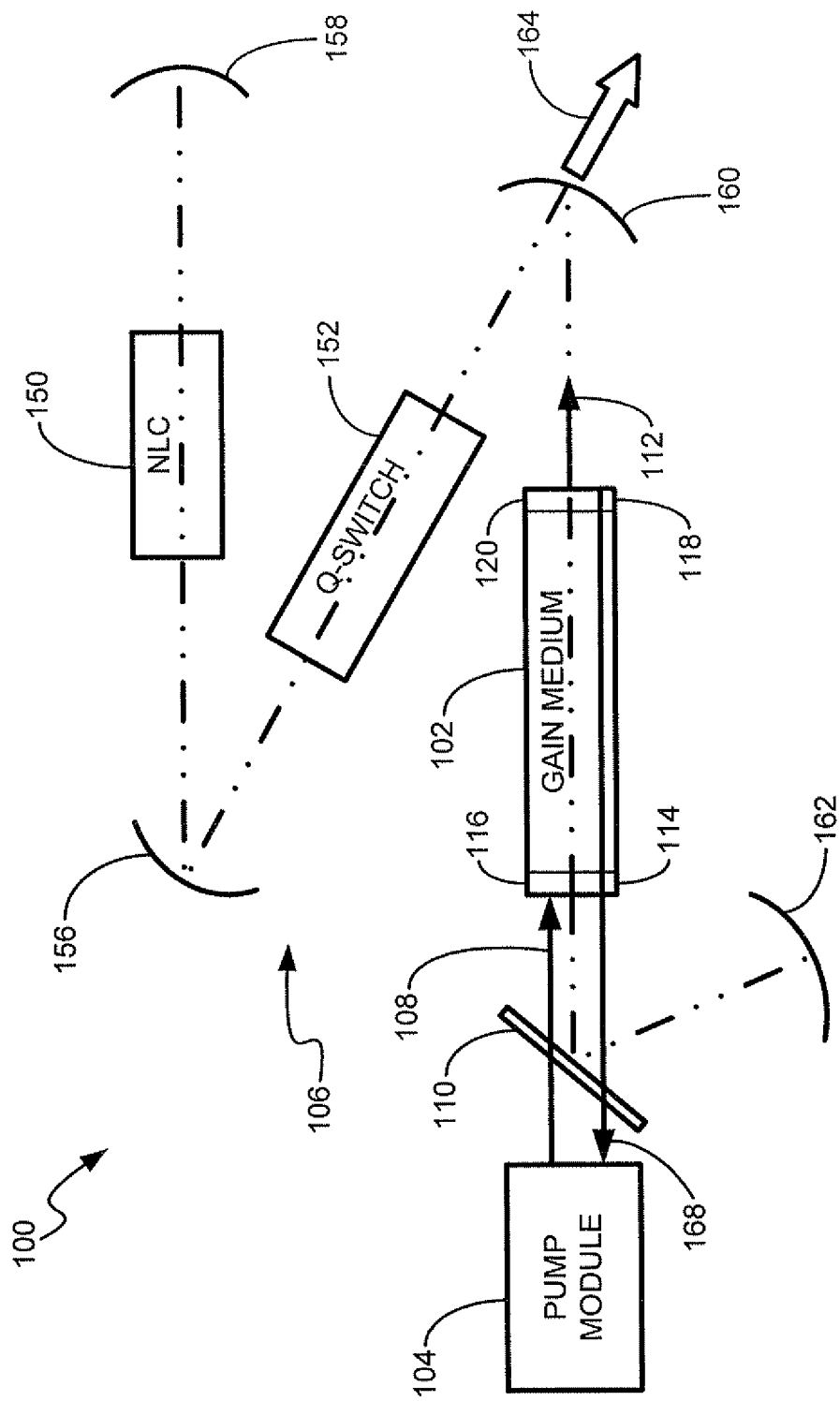
FIG. 1 illustrates a high-power laser system in accordance with embodiments of the invention.

FIG. 1 illustrates a high-power laser system 100 in accordance with embodiments of the invention. The laser system 100 includes a gain medium 102, a pump module 104 and a laser resonator 106. In one embodiment, the gain medium 102 is a doped crystalline host that is configured to absorb pump energy 108 generated by the pump module 104 having a wavelength that is within an operating wavelength range of the gain medium 102. In one embodiment, the gain medium 102 is end-pumped by the pump energy 108, which is transmitted through a beam splitter 110 that is transmissive at the wavelength of the pump energy 108. The gain medium 102 absorbs the pump energy 108 and responsively outputs laser light 112.

The gain medium 102 is water cooled in exemplary embodiments, along the sides of the host. In one embodiment, the gain medium 102 includes an undoped end cap 114 bonded on a first end 116 of the gain medium 102, and an undoped end cap 118 bonded on a second end 120 of the gain medium 102. In one embodiment, the end 120 is coated so that it is reflective at the pump energy wavelength, while transmissive at a resonant mode of the system 100. In this manner, the pump energy that is unabsorbed at the second end 120 is redirected back through the gain medium 102 to be absorbed.

Figure 2:
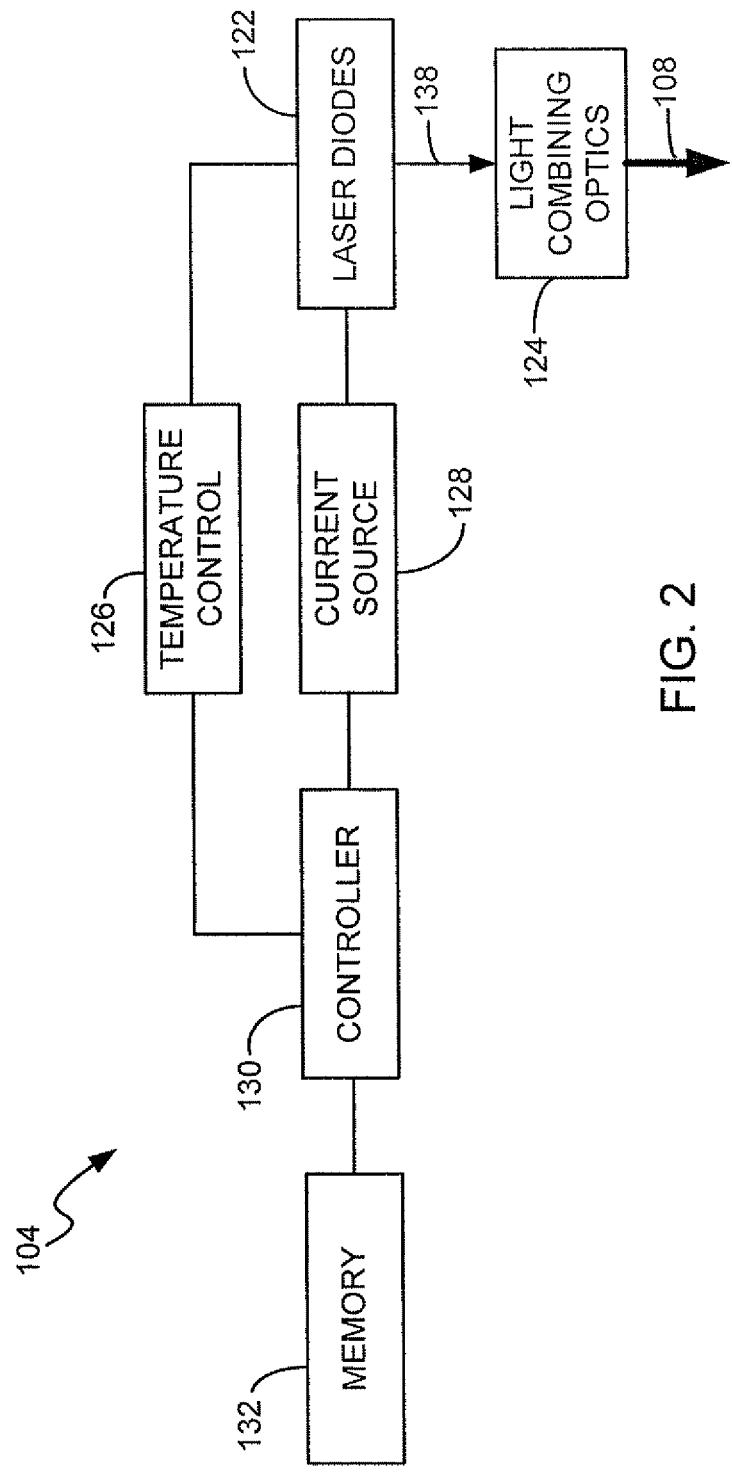
FIG. 2 is a simplified block diagram of a pump module in accordance with embodiments of the invention.

One embodiment of the laser pump module 104 includes a plurality of laser diodes or bars 122 (hereinafter "laser diodes"), light combining optics 124, a temperature control system 126, a current or power source 128, and a controller 130, as shown in the simplified block diagram of FIG. 2. The plurality of laser diodes 122 operate to produce the pump energy 108. In one embodiment, the laser diodes 122 are arranged in an array, such as a multiple bar stack of laser diodes 122.

The wavelength of the pump energy 108 depends on the temperature of the laser diodes 122 and the current supplied to the laser diodes 122. In one embodiment, the controller 130 controls the temperature control system 126 to maintain the laser diodes 122 at a desired operating temperature such that the pump energy 108 is within the operating wavelength range of the gain medium 102. In another embodiment, the controller 130 controls the current source 128 to control the current to the laser diodes 122 and, thus, the power level and wavelength of the pump energy 108. One embodiment of the controller 130 includes one or more processors. In accordance with another embodiment, the controller 130 includes memory 132 that contains instructions executable by the one or more processors to perform various functions, such as, for example, controlling the current to the laser diodes 122 from the current or power source 128 to control the power level of the pump energy 108, and controlling the temperature control system 126 to maintain the temperature of the laser diodes 122 at an operating temperature, at which the pump energy 108 at a given power level is within the operating wavelength range of the gain medium 102.

The light combining optics 124 are configured to combine the light from the laser diodes 122 and output the combined light as the pump energy 108. Embodiments of the light combining optics 124 may comprise a collimation lens, a polarization multiplexer, a brightness doubler, beam shape optics and focusing lenses that focus the pump energy 108 near the first end of the gain medium 102, and/or other optical components.

The laser resonator 106 is configured to generate a harmonic of the laser light 112 output from the gain medium 102. In one embodiment, the laser resonator 106 includes a non-linear crystal (NLC) 150, such as a lithium borate (LBO) crystal or a potassium titanyl phosphate crystal (KTP), for generating a second harmonic of the laser beam 112 emitted by the gain medium 102.

In one embodiment, the gain medium 102 comprises a yttrium-aluminum-garnet (YAG) crystal rod with neodymium atoms dispersed in the YAG rod to form a Nd:YAG gain medium 102, which outputs laser light 112 having a primary wavelength of 1064 nm. The laser resonator 106 generates the second harmonic of the 1064 nm laser light 164 having a second harmonic wavelength of 532 nm. One advantage of the 532 nm wavelength is that it is strongly absorbed by hemoglobin in blood and, therefore, is useful in medical procedures to cut, vaporize and coagulate vascular tissue.

Other embodiments of the gain medium 102 include yttrium-orthoaluminate crystal rod doped with thulium atoms (Tm:YALO) and neodymium doped yttrium-vanadate rod (Nd:YVO$_4$).

In one embodiment, the laser resonator 106 includes a Q-switch 152 that operates to change the laser beam 112 into a train of short pulses with high peak power to increase the conversion efficiency of the second harmonic laser beam 164.

The laser resonator 106 also includes reflecting mirrors 156 and 158, and a folding mirror 160. The mirrors 110, 156, 158, 160 and mirror 162 are highly reflective at the primary wavelength (e.g., 1064 nm). The folding mirror 160 is also transmissive at the second harmonic output wavelength (e.g., 532 nm). The laser beam inside the resonator 106 bounces back and forth between the mirrors 158 and 162, reflects off the folding mirror 160 and propagates through the gain medium 102 and non-linear crystal 150, and is discharged as output laser light 164 at the second harmonic wavelength. The Z-shaped resonant cavity can be configured as discussed in U.S. Pat. No. 5,025,446 by Kuizenga, imaging the resonant mode at one end of the gain medium 102 at the non-linear crystal 150. The configuration described is stable and highly efficient for frequency conversion. The configuration shown in FIG. 1 using the Nd:YAG gain medium 102 produces a frequency converted output laser 164 having a wavelength of 532 nm, as indicated above.

The efficiency at which the gain medium 102 converts the pump energy 108 depends on the length of the gain medium 102 and the absorption efficiency of the gain medium 102 at the wavelength of the pump energy 108. The absorption efficiency varies with wavelength and is dependent on the dopant (e.g., neodymium atoms) and the doping concentration.

Figure 3:
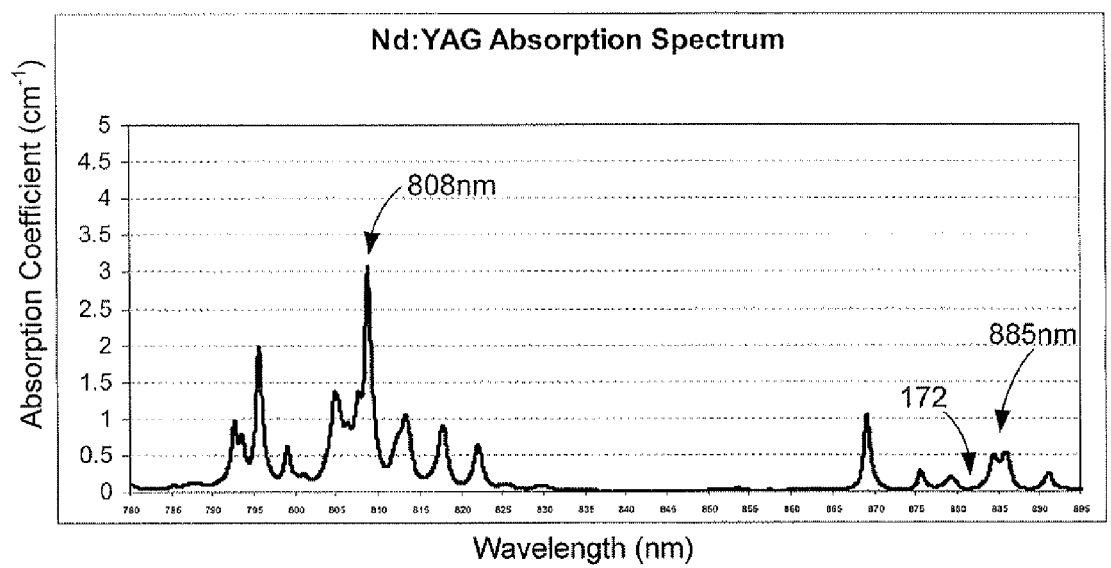
FIGS. 3 and 4 are absorption coefficient curves for a Nd:YAG gain medium.

FIG. 3 shows the absorption coefficient (cm$^{-1}$) (y-axis) of the gain medium 102 (for approximately 0.3% neodymium concentration) versus pump energy wavelength (x-axis) (hereinafter "absorption coefficient curve") over a practical range of wavelengths for a Nd:YAG gain medium. The absorption coefficient includes peaks and valleys over the range of pump energy wavelengths. One conventional practice is to utilize one of the narrow operating wavelength ranges 166 at one of the peaks of the absorption efficiency curve, such as at 808 nm or 885 nm, to maximize the conversion efficiency of the gain medium 102. The narrow operating wavelength ranges at these peaks are approximately 1-2 nanometers. Such narrow operating wavelength bands are intolerant to small wavelength shifts of the pump energy 108, which can be caused by changes in the current to the laser diodes during a power level change of the pump energy 108, or a change in the temperature of the laser diodes 122.

Figure 4:
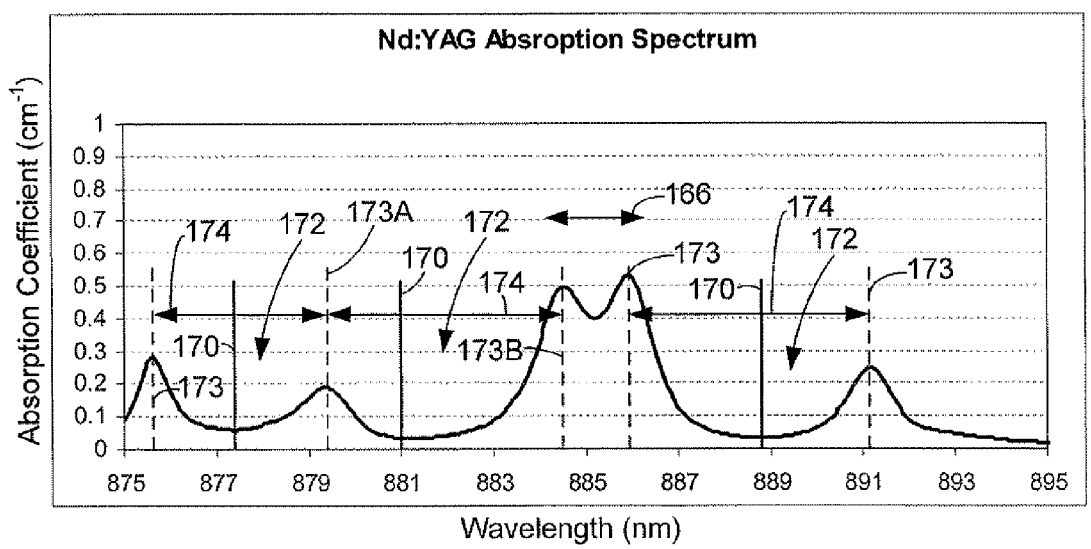

For instance, the operating wavelength range 166 of the Nd:YAG gain medium 102 around 885 nm is approximately 2 nm wide, as shown in FIG. 4. In the likely event that the wavelength of the pump energy 108 shifts outside of the operating wavelength range 166, such as during pump energy power level changes, the absorption efficiency of the gain medium 102 decreases rapidly. This, in turn, results in lower absorption of the pump energy 108 by the gain medium 102, which will adversely affect the output laser light 112 and the laser 164.

We have discovered that the stability of the wavelength of the pump energy 108 is affected by feedback pump energy 168, which is the portion of the unabsorbed pump energy 108 that is reflected off a reflector of the system and is fed back to the pump module 104 through the beam splitter 110, as shown in FIG. 1. As used herein, the reflector may include one or more of the mirrors 156, 158, 160 and 162, or the end 120 of the gain medium. The feedback pump energy 168 causes the wavelength of the output pump energy 108 to shift toward the wavelength of the feedback pump energy 168. This wavelength shift of the pump energy 108 decreases the amount of pump energy that is absorbed by the gain medium 102 and increases the magnitude of the feedback pump energy 168. This effectively holds the wavelength of the pump energy 108 outside the narrow operating wavelength 166 of the gain medium 102 and prevents the stabilization of the wavelength of the pump energy 108 within the narrow operating wavelength range 166 of the gain medium 102.

Embodiments of the invention operate to stabilize the wavelength of the pump energy 108 by setting the operating wavelength 170 of the pump energy 108, which corresponds to the operating wavelength of the gain medium 102, to a wavelength that is within a valley 172 of the absorption coefficient curve for the gain medium 102 rather than a peak 173 of the absorption coefficient curve, as illustrated in FIG. 4. In one embodiment, the operating wavelength 170 is set to a wavelength at which the absorption coefficient of the gain medium is less than 40% of its value at either of the peaks 173 defining the valley, such as approximately 877 nm for the Nd:YAG gain medium 102 (FIG. 4). In one embodiment, the operating wavelength 170 is set to a wavelength at which the absorption coefficient of the gain medium is less than 30% of its value at either of the peaks 173 defining the valley, such as approximately 881 nm and 889 nm for the Nd:YAG gain medium 102. In one embodiment, the operating wavelength 170 is set to approximately the wavelength corresponding to the minimum absorption coefficient within one of the valleys 172, or minimum absorption coefficient wavelength.

In one embodiment, the valley 172 of the absorption coefficient curve containing the operating wavelength 170 has a peak-to-peak wavelength range 174 of at least approximately 3-4 nm.

In one embodiment, the operating wavelength 170 of the pump module 104 is within a range of 879-883 nm. In another embodiment, the operating wavelength 170 is within a range of 875-879 nm. In yet another embodiment, the operating wavelength 170 is within a range of 887-890 nm.

Shifts in the wavelength of the pump energy 108 from within the selected valley 172, particularly when the selected operating wavelength 170 is set to approximately the minimum absorption coefficient wavelength of the gain medium 102, will generally result in increased absorption efficiency of the gain medium 102 due to the increase in the absorption coefficient. This causes a reduction in the magnitude of the feedback pump energy 168 and reduces the impact of the feedback pump energy 168 on the wavelength of the pump energy 108. Even so, the majority of the feedback pump energy 168 will be at the minimum absorption coefficient wavelength for the gain medium 102 within the selected valley 172. Thus, the feedback pump energy 168 will operate to stabilize the wavelength of the pump energy 108. In one embodiment, the feedback pump energy 168 has a wavelength that approximately matches the operating wavelength 170 of the pump module.

In one embodiment, the gain medium 102 is configured to have a pump energy to laser light conversion efficiency at the operating wavelength 170 of the pump module 104. This is generally accomplished by selecting an appropriate doping level of the dopant (e.g., neodymium atoms) and the length of the crystal rod, in accordance with known techniques.

In one embodiment, the doping level is relatively low to allow distribution of the thermal load along the optical axis of the gain medium 102, thereby reducing the thermal stresses induced at the input end 116 (FIG. 1) of the gain medium 102. In one embodiment, the doping concentration of the Nd:YAG gain medium 102 is within a range of about 0.6% to 0.9%. In one embodiment, the gain medium 102 is approximately 100 millimeters long between the first end 116 and the second end 120 and has a diameter of approximately 4.5 millimeters.

Figure 5:
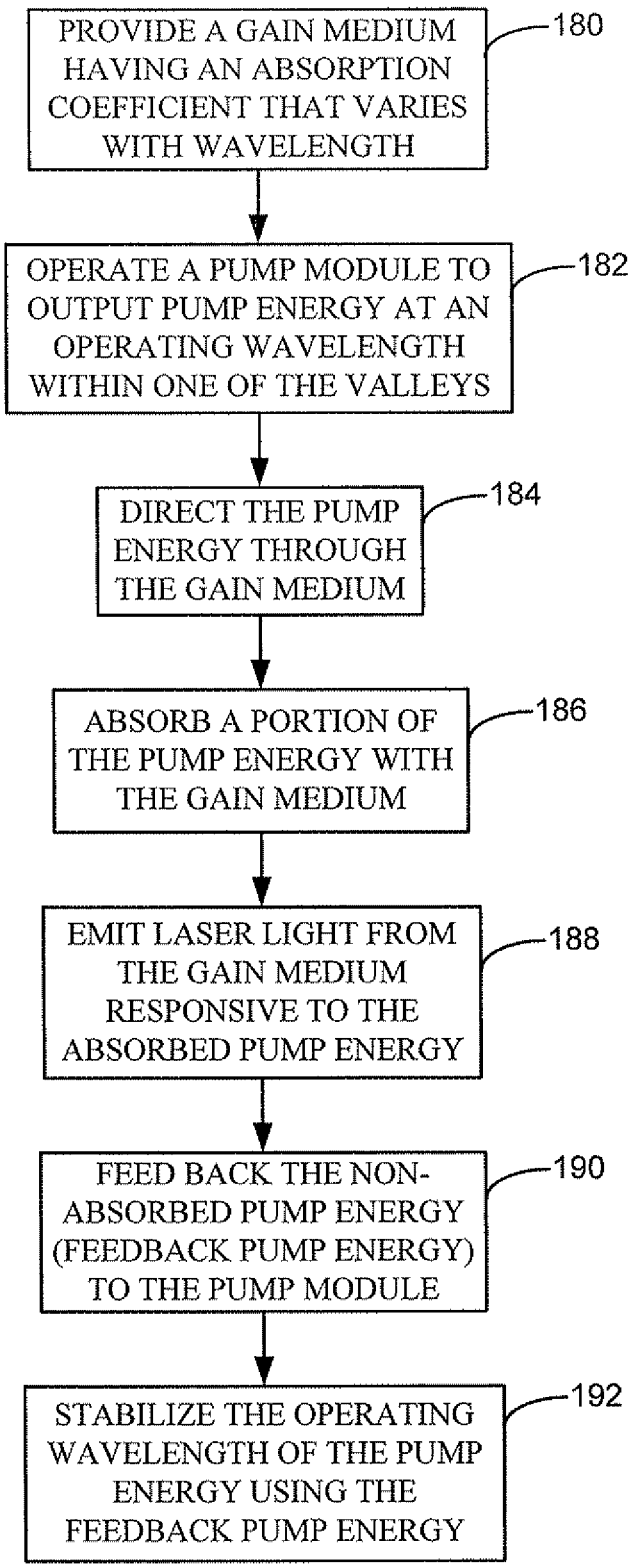
FIG. 5 is a flowchart illustrating a method in accordance with embodiments of the invention.

Another embodiment of the invention is directed to a method of operating the laser system described above in accordance with embodiments of the invention. FIG. 5 is a flowchart illustrating one embodiment of the method. At 180, a gain medium 102 is provided having an absorption coefficient that varies with wavelength. The absorption coefficient curve for the gain medium 102 comprises peaks 173 and valleys 172, as illustrated in FIG. 4. At 182, a pump module 104 is operated to output pump energy 108 at an operating wavelength 170 within one of the valleys 172. In one embodiment, the absorption coefficient of the gain medium 102 is approximately less than 40% of the absorption coefficient at an adjacent peak 173 of the absorption coefficient curve defining the valley 172. For instance, when the operating wavelength 170 is selected to be approximately 881 nm, the corresponding absorption coefficient is less than 40% of the absorption coefficient of the adjacent peaks 173A and 173B that define the valley 172, as shown in FIG. 4.

At 184, the pump energy 108 is directed through the gain medium 102 (FIG. 1) and a portion of the pump energy 108 is absorbed by the gain medium at 186. Laser light 112 is emitted, at 188, from the gain medium 102 responsive to the absorbed pump energy 108. The non-absorbed pump energy or feedback pump energy 169 is fed back to the pump module 104, at 190. At 192, the operating wavelength 170 of the pump energy 180 is stabilized using the feedback pump energy 168.

Additional embodiments of the method correspond to the various embodiments described above with regard to the system 100.

Although the present invention has been described with reference to preferred embodiments, workers skilled in the art will recognize that changes may be made in form and detail without departing from the spirit and scope of the invention.

What is claimed is:

1. A method of stabilizing pump energy comprising:
configuring a gain medium having an absorption coefficient, wherein an absorption coefficient curve of the absorption coefficient over a range of wavelengths comprises peaks and valleys;
generating a pump energy using a plurality of laser diodes, the pump energy having an operating wavelength within one of the valleys, at which the absorption coefficient is approximately at a local absorption minimum;
transmitting the pump energy through the gain medium;
absorbing a portion of the pump energy with the gain medium;
emitting a laser light from the gain medium responsive to the portion of the pump energy;
feeding back a non-absorbed portion of the pump energy (feedback pump energy) to the laser diodes at a feedback wavelength; and
stabilizing the operating wavelength of the pump energy by using the feedback pump energy to maintain the operating wavelength approximately at the local absorption minimum.

2. The method of claim 1, further comprising performing a surgical operation using the laser selected from the group consisting of coagulate tissue, cut tissue, vaporize tissue and ablate tissue.

3. The method of claim 1, wherein the gain medium comprises a yttrium-aluminum-garnet (YAG) crystal rod with neodymium atoms dispersed in the YAG crystal rod.

4. The method of claim 3, wherein the operating wavelength is within a range of 879-883 nm.

5. The method of claim 3, wherein the operating wavelength is within a range of 875-879 nm.

6. The method of claim 1, wherein the operating wavelength is approximately 881 nm.

7. The method of claim 1, wherein the operating wavelength is approximately 877 nm.

8. The method of claim 1, wherein the operating wavelength is approximately 889 nm.

9. The method of claim 1, wherein generating the pump energy at an operating wavelength within one of the valleys comprises generating the pump energy at an operating wavelength, at which the absorption coefficient is approximately less than 30% of the absorption coefficient of an adjacent peak defining the valley.

10. The method of claim 1, wherein the step of generating the pump energy at an operating wavelength within one of the valleys comprises generating the pump energy at an operating wavelength, at which the absorption coefficient is approximately less than 40% of the absorption coefficient of an adjacent peak defining the valley.

11. The method of claim 1, wherein the feedback pump energy has a wavelength that approximately matches the operating wavelength.

12. A laser system comprising:
  a plurality of laser diodes configured to generate a pump energy at an operating wavelength;
  a gain medium configured to absorb a portion of the pump energy and emit a laser light responsive to the portion of the pump energy; and
  a reflector in a path of the pump energy, the reflector configured to direct a non-absorbed portion of the pump energy back to the laser diodes at a feedback wavelength;
  wherein:
  an absorption coefficient curve of an absorption coefficient of the gain medium over a range of wavelengths comprises peaks and valleys,
  the operating wavelength is within a valley of the absorption coefficient curve, at which the absorption coefficient is approximately at a local absorption minimum within the valley, and the operating wavelength is stabilized by using the non-absorbed portion of the pump energy to maintain the operating wavelength approximately at the local absorption minimum.

13. The laser system of claim 12, wherein the gain medium comprises a yttrium-aluminum-garnet (YAG) crystal rod with neodymium atoms dispersed in the YAG rod.

14. The laser system of claim 12, wherein the operating wavelength is within a range selected from the group consisting of 875-879 nm and 879-883 nm.

15. The laser system of claim 13, wherein the operating wavelength is approximately 881 nm.

16. The laser system of claim 13, wherein the operating wavelength is approximately 877 nm.

17. The laser system of claim 13, wherein the operating wavelength is approximately 889 nm.

18. The laser system of claim 12, wherein the absorption coefficient at the operating wavelength is approximately less than 40% of the absorption coefficient at an adjacent peak of the absorption coefficient curve defining the valley.

19. The laser system of claim 12, wherein the absorption coefficient at the operating wavelength is approximately less than 30% of the absorption coefficient at an adjacent peak of the absorption coefficient curve defining the valley.

20. A method of stabilizing pump energy comprising:
  generating a pump energy in a pump source having an operating wavelength approximately at a local absorption minimum of a gain medium;
  transmitting the pump energy through the gain medium;
  absorbing a portion of the pump energy with the gain medium;
  emitting laser light from the gain medium with the portion of the pump energy; and
  feeding back a non-absorbed portion of the pump energy to the pump source at a feedback wavelength to stabilize the operating wavelength by using the non-absorbed portion to maintain the operating wavelength approximately at the local absorption minimum.

* * * * *